INVENTORS
Terry O. Hockenberry &
Everard M. Williams

INVENTORS
Terry O. Hockenberry &
Everard M. Williams

United States Patent Office

3,510,621
Patented May 5, 1970

3,510,621
ELECTRODE POSITIONING CONTROL FOR ELECTRIC DISCHARGE MACHINING APPARATUS AND THE LIKE
Terry O. Hockenberry, Pittsburgh, and Everard M. Williams, Oakmont, Pa., assignors to Siltronics, Inc., Oakmont, Pa., a corporation of Pennsylvania
Filed Dec. 19, 1966, Ser. No. 602,722
Int. Cl. B23p 1/14
U.S. Cl. 219—69
8 Claims

ABSTRACT OF THE DISCLOSURE

We disclose a control circuit for gap discharge apparatus comprising substantially constant voltage drop means coupled in series with the discharge circuit and the discharge gap of such apparatus, said constant voltage drop means having a voltage-current characteristic such that very little current flows therethrough until a predetermined voltage drop across said constant voltage drop means is attained, and circuit means coupled across said constant voltage drop means for conducting signal voltages generated by said voltage drop means to external control mechanism for relatively adjusting the electrodes defining said discharge gap.

---

The present invention relates to a control circuit and mechanism for electric discharge machining (EDM) apparatus, and more particularly to an adjustable controlling circuit for positioning the electrode means of the apparatus relative to the workpiece. The invention is directed to maintaining at all times an optimum gap between the electrode means and the workpiece, which gap can be preselected by adjustment of the control circuit of the invention, for example to maintain precisely and respectively different gap widths for differing sets of operating or machining conditions.

The control circuit of the invention is adapted for use with the basic relaxation-type power supply or other self-timed power supply circuit usually employed with EDM apparatus, and with typical electrode positioning means such as described and claimed in applicant's co-pending and co-assigned application entitled "Power Supply and Automatic Control Systems for High-Speed Electric Discharge Machining Apparatus," filed Aug. 10, 1965, Ser. No. 478,563; or in applicant Williams' Pat. No. 2,841,686 issued July 1, 1958, and entitled "Automatic Control System for the Electrode of a Spark Cutting Apparatus."

In the electric discharge machining process, the workpiece is immersed in a bath of dielectric liquid, such as kersene, while an electrode tool is extended into the bath and is advanced toward the workpiece. The electrode tool is provided with a profile similar to that of the desired shape to be imparted to the workpiece. In this connection, the tool can be provided with any desired shape of geometric and non-geometric or other irregular configurations. Moreover, a design can be cast or otherwise imparted to the face of the electrode tool, which will then be oppositely reproduced on the workpiece surface. Depending on the application of the invention, the electrode tool can be provided with a number of electrode tips for simultaneously machining a number of such designs on the same or respectively separate workpieces.

An electric potential difference is applied between the tool and the workpiece and when the former is advanced so that the spacing becomes requisitely small there is a breakdown of the dielectric interposed between the tool and the workpiece. This breakdown is usually termed "spark over," hence the term "spark machining" sometimes applied to the EDM process, and is followed by an arc discharge of very short duration of, at the most, a few milliseconds. Then the transient arc ceases, permitting the discharge path to be deionized and to restore the insulating property of the dielectric liquid. As a result of the arc discharge, a tiny crater is formed in the workpiece while a second, smaller crater is formed in the tool. In the working process, the tool is continuously advanced toward the workpiece to permit repetitive and closely spaced but intermittent discharges, and ultimately the desired shape of the hole or cavity is formed in the workpiece.

When the gap between the electrode and the workpiece is reduced to a sufficiently small value, in many applications of the order of 0.003″ per 100 volts, the dielectric breaks down and an arc discharge takes place. The range of sparkover work voltages in production machines presently in use varies from approximately 40–400 volts. Oscillographic measurements of typical discharges from such EDM machines show that the discharges are oscillatory in nature. Typical sparkover repetition rates presently range from 50–100,000 discharges per second. The detached fragments of the workpiece and electrode material are removed by the dielectric flow resulting from local pressures caused by the localized explosiveness of the arc discharges. This removal can be augmented by forced circulation of the dielectric fluid.

Variations in the gap between the electrode means and the workpiece, owing to inaccurate electrode positioning, as machining proceeds, can result in inaccurate and unreproducible machined surface contours. For fine-finishing cuts, the electrode means must be advanced carefully and accurately. Measurements show that the gap width (corresponding to voltage with which the capacitor is charged as the instant discharge takes place) has little effect on crater depth and area, but is significant in that the machining tolerance deteriorates as gap width is increased. Proper control of the operating gap, therefore, has an important effect on machining accuracy.

In the EDM process, the erosion of the workpiece or the sum total of the spark-induced craters, is most efficient when the workpiece is positive. The EDM process evidently, then, is quite different from arc-cutting systems in which the greater erosion takes place at the negative electrode. Arc erosion is accompanied by high-temperatures and melting, whereas in spark erosion there is often little evidence of the existence of elevated temperatures and melting of the workpiece surface.

For most applications the EDM process is conducted with as high a discharge recurrence rate as is feasible without developing sustained arcing. In order to approach closely this ideal condition, it is essential that the electrode tool be carefully advanced by the automatic drive means for the electrode tool. In controlling such advance of the electrode tool means toward the machined area of the workpiece it is necessary to maintain the width of the gap relatively constant during movements of the electrode tool.

When the discharge gap is short-circuited, as by the presence of debris or by improper positioning of the electrode tool, current, of course, flows continuously. As the discharge gap is widened from this condition, very rapid oscillatory discharges appear, which decrease in repetition frequency as the gap is widened, until the open circuit condition is attained. The very fast discharges, of small amplitude, have insufficient energy for proper machining, while the slow discharges of high-amplitude do not remove successive portions of material sufficiently rapidly for proper machining. Between these two conditions is an optimum gap width for a given set of machining conditions, workpiece and electrode tool materials, etc., where the amplitude of the pulses are sufficient to remove significant portions of the material and the frequency of the pulses is high enough for rapid machining operations.

The optimum gap thus is correspondingly different for different machining conditions. For example, different optimum gap widths are dictated when coarse, medium or fine cuttings are being made by the EDM machining apparatus or when different voltage and current levels, electrode tool materials, workpiece materials and the like are employed. Other conditions also affect the optimum gap spacing. For example, the spacing is larger when the machining area is small or when the electrode tool means are "breaking through" the workpiece on a through-hole operation.

Known forms of automatic positioning controls are, in the more efficient types, related to average discharge gap voltage and are typified by the aforementioned Williams patent. Other positioning controls are related to gap current or to frequency of the repetitive gap discharges, e.g., the patent to V. E. Matulaitis, No. 3,035,149.

Known forms of electrode tool automatic positioning apparatus produce a substantially linear output or error signal with respect to error deviation in the width of the gap, or variance from the optimum gap width established by a given set of machining conditions. Moreover, this linear corrective signal varies directly with the error in gap width for only a single optimum gap width for which the automatic positioning means is primarily designed, although the automatic positioning apparatus may be adjustable to maintain differing gap widths.

When known positioning apparatus is adjusted away from the median or single optimum gap width for which it is designed to control, the output or corrective action of the positioning means still remains linear but is no longer related directly to the gap width error or deviation from the preset optimum gap width. Accordingly, the corrective action of the positioning means while still opposite in sense to the gap error becomes too slow in moving the electrode tool back to optimum gap width position for a given sense of gap error. Thus, for example, when an optimum gap width is preselected which is narrower than the designed optimum or control gap width of the positioning apparatus, the apparatus becomes slow in withdrawing the electrode tool, for example, when the gap becomes short-circuited, as by the presence of debris. On the other hand, when an optimum gap width is preselected which is wider than the designed control gap width of the positioning apparatus, the latter becomes too slow in moving the tool toward the workpiece should the gap become open-circuited. By the same token, gap errors in the negative sense, but less than the short-circuited condition, are corrected still more slowly in the former condition, while errors in the positive sense in the latter condition are corrected with even less speed than the open-circuit condition.

In any event, the linear character of known positioning apparatus produces relatively slow and, therefore, insufficient corrective action for gap deviations in either direction which are correspondingly close to the control point. This undesirable result attains irrespective of the adjustment of the positions to its design gap width or to larger or smaller gap widths.

In previous electrode positioning circuits, the corrective action of the positioning means controlled thereby was related to the discharge voltage, charging impedance voltage drops, or some other averaged function, all of which vary linearly with gap deviation. Accordingly, the corrective action also varied linearly and thus did not produce adequate rapidity of control of the gap spacing. On the other hand, the novel control circuit and positioning means of the invention area related to the "duty-cycle" of the current through the machining gap, i.e. the percentage of time in which current flows through the gap during operation of the EDM apparatus. Since the current duty cycle increases very rapidly as the gap decreases in the proper machining range, then, the speed of corrective action applied by the positioning means initially increases very rapidly with relatively small error deviations from the optimum gap spacing.

The presently disclosed control circuit for automatic positioning apparatus thus overcomes the aforementioned problems by providing a control circuit which produces a non-linear corrective signal to the positioning apparatus and thereby obtains a more sensitive region of positioning control adjacent the optimum or preselected gap spacing. Moreover, the sensitive control region is obtained regardless of the width of that optimum gap which is selected for a given set of operating or machining conditions. Moreover, the motor or other drive for the electrode tool forming part of the positioning apparatus operates at the same speed to oppose short circuit and open circuit gap deviations of the electrode tool irrespective of the particular optimum gap width which is selectively imposed as a control point upon the controlling circuit. Owing to the non-linear character of the error signal produced by the control circuit, the speed or corrective action of the positioning apparatus increases very rapidly with small deviations on either side of the preselected gap width.

These desirable results are accomplished by the novel control circuit disclosed herein, which employs the discharge gap "duty cycle" of EDM apparatus, or that fraction of the total time in which current flows in the gap discharge circuit, as a basis for producing an error signal which varies directly but non-linearly with gap deviations. The gap duty-cycle is zero when the gap is open circuited and increases very rapidly as the gap decreases till the gap is short circuited, in which case the duty cycle is 100%. The duty cycle sensor of the control circuit is arranged so that it necessarily monitors only the presence of the discharge pulse, rather than the magnitude thereof.

In an exemplary ararngement of the control circuit, as disclosed herein, an approximately constant voltage-drop means is connected in the gap discharge circuit of the EDM apparatus, preferably in electrical series relation with the gap between the electrode tool means and the workpiece, and with the capacitance which is usually coupled thereacross. The constant voltage drop means is arranged to permit a very small or no-current flow in either direction until a predetermined gap voltage is attained. Thereafter, a relatively small voltage increase causes a large increase of current through the constant voltage drop means. The resulting voltage drop across the constant voltage drop means, therefore, does not disturb the operation of the gap discharge circuit. With this arrangement, additional circuit components are coupled to the constant voltage drop means in order to derive therefrom an error signal which is suitably amplified and supplied to the aforementioned electrode positioning apparatus. Owing to the character of the aforedescribed control circuit, including the constant voltage drop means forming part thereof, the resultant error signal generated by deviations from the preselected discharge gap is non-linear for the purposes described above.

In the foregoing discussion, various objects, features and advantages of the invention have been alluded to. These and other objects, features and advantages of the invention will be elaborated upon during the forthcoming detailed description of certain presently preferred embodiments of the invention, together with preferred methods of practicing the same.

In the accompanying drawings, we have shown presently preferred embodiments of the invention and have illustrated preferred methods of practicing the same, wherein.

Figure 5:
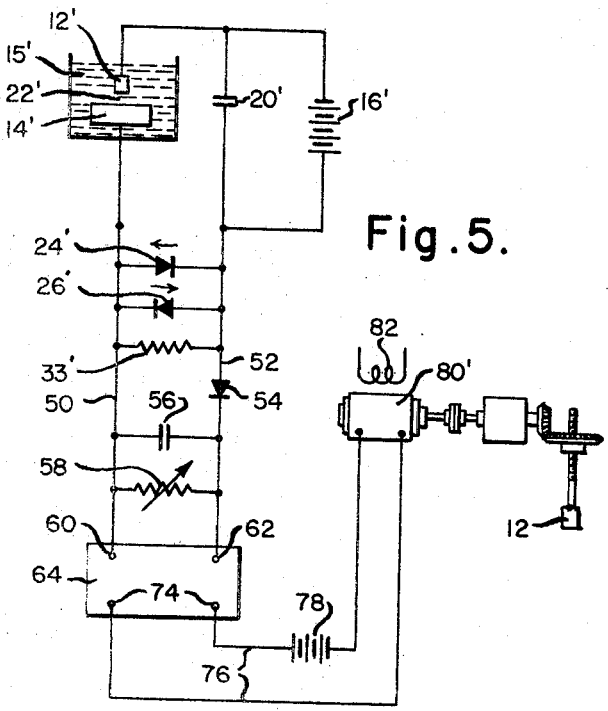
FIGURE 5 is a schematic circuit diagram of another form of the control circuit of the invention.
Figure 7:
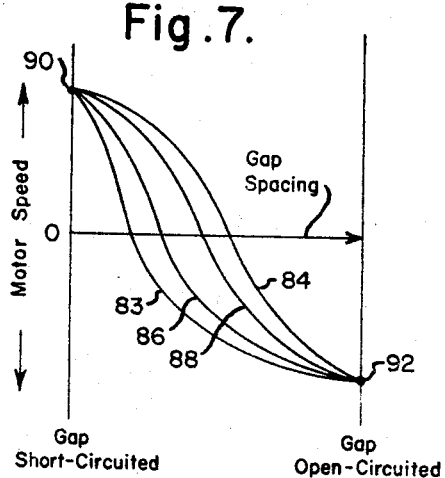
Figure 8:
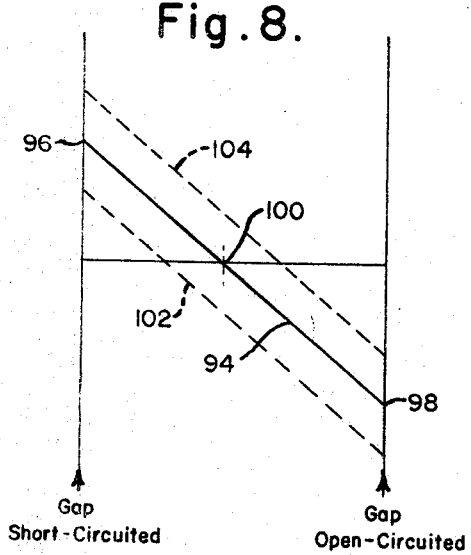

FIGURE 7 is a graphical representation illustrating the corrective action imposed by automatic positioning apparatus when controlled by the control circuit of the invention and corresponding to the balance settings illustrated in FIGURE 5; and FIGURE 8 is a graphical showing of the corrective action or output of conventional automatic positioning apparatus and control circuits, for purposes of comparison.

Figure 9:
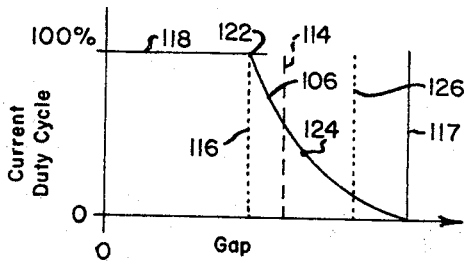
Figure 10:
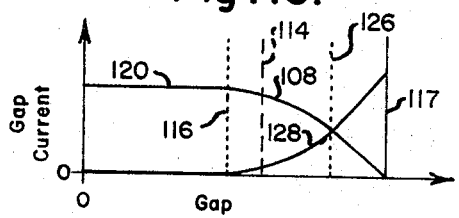
Figure 11:
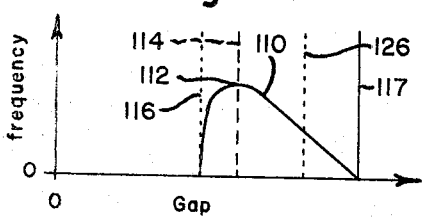

FIG. 9 is a graphical representation of the gap discharge current duty cycle as it varies with changes in gap width in the EDM process;

FIGURE 10 is a graphical representation of the variation in the corresponding gap voltage and current; and FIGURE 11 is a graphical representation of the variation in the corresponding gap discharge rate or frequency.

Figure 1:
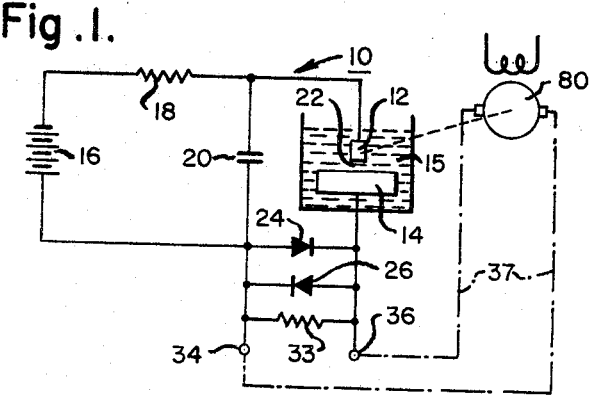
FIG. 1 is a schematic circuit diagram of a basic arrangement of the control circuit of the invention.

With reference now to FIG. 1 of the drawings, an electrode positioning control circuit 10 is illustrated for use in relatively positioning an electrode tool 12 and work-piece 14 which are immersed in a dielectric bath 15 and thus represent schematically a typical EDM apparatus. In this arrangement of the invention, the control circuit 10, a relaxation type power supply illustrated in simplified form by battery or other source of DC potential 16, series-connected resistance 18, and parallel connected capacitance 20. The capacitance 20 is thus coupled in the usual fashion relative to the source 16 and so as to be provided with a charging path through resistance 18 and with a discharge path through spark machining gap 22 between the electrode tool means 12 and the workpiece 14.

The capacitance can be charged and the cutting pulse can be prolonged (if desired) by the corresponding discharge circuit described and claimed in our copending application entitled Power Supply Circuitry for EDM Apparatus and the Like, Ser. No. 602,724 and filed concurrently herewith.

It will be understood, of course, that the relaxation circuit thus far described and representing the power supply for the EDM apparatus 12–14 can be replaced by any suitable power supply arranged to supply a series of pulses across the discharge gap 22, where the current duty cycle of the pulses varies with the width of the gap.

In order to convert the current duty cycle of the gap discharges into an error signal representing variations in gap width, a pair of opposed, parallel connected diodes 24 and 26 are coupled in series-parallel relation into the aforementioned discharge circuit. As seen from FIGURE 1, the diodes 24 and 26 are reversely directed with respect to one another, so that both positive and negative oscillations of discharge current can flow through the gap discharge circuit.

The "duty cycle" signal which is derived from gap discharge current duty cycle by the reversed diodes 24, 26 is dependent upon the full forward voltage-drop characteristic of the diodes. This characteristic is typical of silcone semiconductor junctions and other types of semiconductor diodes. As an increasing voltage is applied to the diodes 24 or 26, very little current flows in either direction until a voltage of about 0.6 volt, in the case of a silicone diode, is reached. Thereafter, a small voltage increase induces a large current increase through the diode 24 or 26 depending upon the sense of the current. Thus diode resistances in the forward direction is initially very large until the voltage across them attains the threshold level, after which the diode resistance becomes very small.

The small voltage drop across the diodes 24 and 26 does not disturb the operation of the discharge circuit including capacitance 20 and the discharge gap 22. It follows, then, that the normal voltage and current wave forms associated with the repetitive gap discharges are present for the machining operation and thus are encountered by the error signal generating circuit of FIG. 1 including primarily the reversely connected diodes 24, 26. It will be understood, of course, that diodes of differing threshold voltage level can be substituted depending upon the application of the invention.

Figure 2:
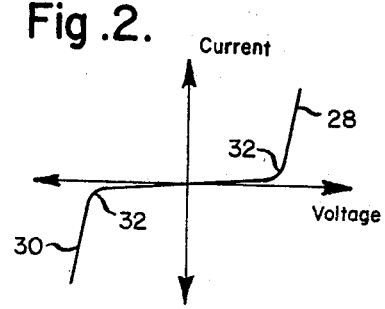
FIGURE 2 is a graphical representation of the current and voltage relationships of the current limiting means forming part of the control circuit.

In FIG. 2 of the drawings, the forward voltage drop characteristic of the diodes 24, 26 is represented graphically. In FIG. 2, curve 28 represents the flow of current in diode 24 as voltage is increased in one direction, while curve 30 represents the flow of current in diode 26 as the voltage is increased in the opposite direction. The knee 32 of either current curve illustrates the sudden rise in current of either diode when the forward voltage threshold is attained.

Referring again to FIG. 1, a resistance 33 coupled in parallel with the diodes 24, 26 serves to reduce voltage spiking which occurs because of transients accompanying "turn-on" of the respective diodes.

Accordingly, when the EDM apparatus 12–15 is operated, an error signal is generated by the diodes 24, 26 which appears across output terminals 34 and 36. Such error signal can be detected as repetitive signal pulses across the terminals 34 and 36, which are each equal in amplitude to one another and to the forward voltage drops of the diodes 24, 26 but which are related in number to the current duty cycle of oscillatory discharges across the discharge gap 22. The collective signal output of the diodes, therefore, will be oscillatory in nature and will have a current duty cycle equal to and in phase with the major oscillations of the gap discharge current. Accordingly, when the discharge gap is open-circuited, the output voltage of terminals 34, 36 will be zero. Conversely, when the gap is short-circuited for any reason, current flows continuously through the gap and through the diode 24, for example, which produces a voltage drop or signal at the terminals 34, 36 equal to the diode forward threshold voltage. Between these extremes, intermittent series of positive and negative pulses appear at the output terminals 34, 36 each time the discharge gap 22 breaks down, with the pulse repetition frequency varying with the gap width.

Figure 3:
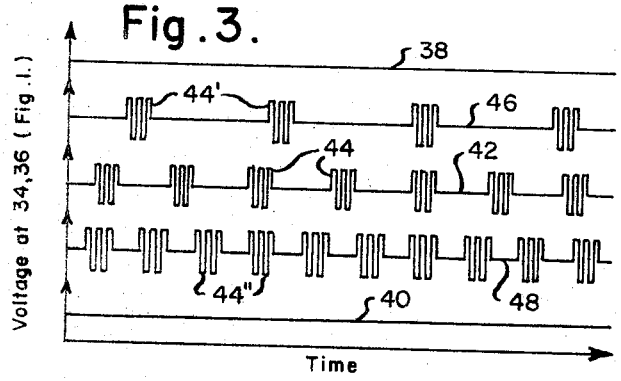
FIGURE 3 is a graphical representation of exemplary output wave forms of the current limiting means of the invention for various discharge gap spacings.
Figure 4:
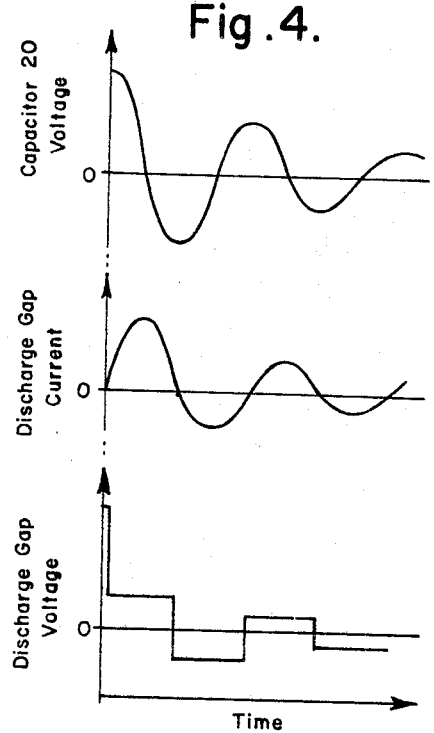
FIGURE 4 is a graphical representation of the oscillatory character of typical discharge gap voltages and currents.

The signal output wave forms at the output terminals 34, 36 for various discharge gap conditions are illustrated graphically in FIG. 3 of the drawings. Curve 38 represents the absence of signal when the discharge gap 22 is open-circuited, while curve 40 denotes a continuous signal equal to the diode forward voltage drop which occurs when the discharge gap is short-circuited. Curve 42, on the other hand, denotes a typical output signal, comprising groups of uniform pulses 44, at the optimum gap spacing. Each group of pulses 44 is occasioned by a single capacitor discharge across the gap 22, together with those few of the ensuing damped oscillations (FIG. 4) of each capacitor discharge, which exceed the forward voltage threshold of the diodes 24 and 26. The current duty cycle of the groups of pulses 44 represents the current duty cycle of the gap current. Therefore, the signal corresponding to the curve 42 can be selected as a standard signal to represent the optimum gap width for a given set of machining conditions, and deviations therefrom can be employed to position the movable electrode 12, through suitable control means represented by chain-outlined circuit means 37 and driving means 80. For example, curve 46, exhibiting a correspondingly short duty cycle of current illustrates too large a gap width. On the other hand, curve 48 wherein the duty cycle of current is approaching 100% denotes a gap width less than the aforementioned optimum.

It will be seen, then, that the control signal at terminals 34, 36 does not depend upon the initial amplitudes of the gap discharges nor upon the average gap voltage, both of which vary linearly with the deviation in gap width, but rather upon the current duty cycle of the discharges. Thus, the control signal varies non-linearly with gap deviation. Moreover, as is evident from FIG. 3, the successive pulses of the control signal are each of the same amplitude and duration as denoted by curves 42, 46 and 48 of FIG. 3. Accordingly, the signal at output terminals 34, 36 is ideally suited for control purposes and for this use, desirably is suitably amplified and compared with a standard of reference signal as described in greater detail below.

In order to utilize the control signal described above, additional circuit means are associated with the diode detector arrangement 24–26 for balancing the signal output voltage against the aforementioned standard or reference signal which is desirably related through adjustable balancing means to a selectable optimum discharge gap 22. Desirably, in order properly to balance the output signal of FIG. 3 against a standard signal, the negative portions of each groups of oscillations such as 44, 44' or 44'' are removed by suitable circuit means.

Referring now to FIG. 5 of the drawings, one arrangement for balancing the control signal generated as described in connection with FIG. 3, against a standard signal potential is illustrated. In this example, the power supply portion of the circuit is generally similar to that shown in FIG. 1 and will not be further described. The diodes 24', 26' and the smoothing resistance 33' function as described in connection wtih FIG. 1, and the outputs thereof are coupled through conductors 50 and 52 to rectifier 54 and capacitance 56 in series-parallel relationship, and to rheostat 58 in parallel with capacitance 56. The rectifier 54, capacitance 56 and rheostat 58 comprise the balancing portion of the control circuit. The rectifier 54 permits current flows through output conductors 50, 52 only when the diode 26' is in its forward conduction state and therefore, removes the lower or negative portions of the groups of oscillations 44, 44' and 44'' (FIG. 3) which are the signal outputs of diode 24'. As a result, the capacitance 56 is charged to a potential equal to the forward voltage drop of diode 24' each time the latter is conducting. During the intervals between discharge pulses, the rectifier 54 also prevents the capacitance 56 from discharging back through diode 26'. Therefore, the capacitance 56 must discharge through rheostat 58 at these times. Accordingly, rheostat 58 serves as a variable load resistance, and the output voltage developed thereacross is applied through the conductor 50, to input terminals 60 and 62 of suitable amplifying means such as the DC amplifier 64, of known construction.

The average voltage of the capacitance 56, therefore, is related to the duty cycle of the gap current. The relation of this average voltage to the duty cycle of the gap current depends upon the setting of rheostat 58.

Figure 6:
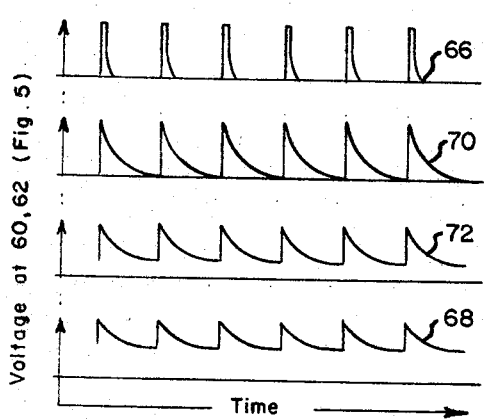
FIGURE 6 is a graphical representation illustrating the variation in error signal wave forms for various balance settings of the control circuit of FIGURE 4.

The latter relationship is illustrated graphically in FIG. 6 of the drawings wherein voltage curve 66 represents a low average voltage output of the control circuit appearing at amplifier terminals 60, 62, at a low rheostat setting while voltage curve 68 is obtained with a high rheostat setting. Curves 70 and 72 respectively represent intermediate rheostat adjustments. Thus, as the potentiometer is adjusted in the direction of increasing resistance, the time constant of the capacitance 56 and rheostat resistance becomes larger, and the average output voltage at terminals 60, 62 likewise increases. By thus varying the rheostat 58 a standard output signal can be preselected within limits, which corresponds to a desired optimum width of the gap 22.

The amplifier 64 produces an amplified output voltage at its terminals 74, which varies geometrically with gap deviations about the amplified output level established by the setting of the rheostat 58. However, the amplifier output voltage will vary about each such preselected voltage level depending upon the current duty cycle of the gap discharges or otherwise upon the gap condition, as when the gap is open or short-circuited. The amplifier output, of course, follows the similar variation of the control circuit signal developed across the rheostat 58.

The amplifier output is then fed through conductors 76 in opposition to a series-connected source of standard potential represented by battery 78 to the armature of an electric motor drive 80 for the electrode tool 12. In this arrangement, the field 82 is separately excited. The standard potential source 78 is equal and opposite to the amplifier output voltage when the discharge gap 22 is at its optimum width, which is preselected as aforesaid by adjustment of rheostat 58.

Subsequent adjustment of the rheostat 58 to another output voltage level causes a different rate of capacitance 56 discharge to produce an amplified signal equal to the standard potential source 78, and therefore, drive motor 80' moves the electrode tool to another corresponding optimum gap width setting, in order to balance the control and positioning circuits. More specifically, as rheostat resistance is increased, the resultant larger RC time constant controls the gap width at a larger width since a lower current duty cycle of discharge and resultant pulses 44 (FIG. 3) is required to balance the standard potential source 78. On the other hand, as rheostat resistance is reduced, a larger current duty cycle of gap discharge resulting from the correspondingly narrower discharge gap is required to balance the source 78.

Only comparatively small deviations in the gap width for this purpose, however, are required in order to effect a considerable change in discharge current duty cycle as noted previously.

This relationship is illustrated more clearly in FIG. 7 of the drawings, which shows graphically the overall control characteristics of the gap discharge, current duty cycle-responsive control circuit and mechanism of FIG. 5. In FIG. 7, control characteristic curves 83 and 84 correspond, for example, respectively to rheostat output curves 66 and 68 of FIG. 6, with the relative positions of curves 83 and 84 denoting corresponding discharge gap widths. Intermediate control characteristic curves 86 and 88 similarly correspond to rheostat output curves 70 and 72.

It will be noted in FIG. 7 that all of the curves converge at a positive ordinant point 90 representing maximum motor speed in the forward direction when the discharge gap 22 is short-circuited. Similarly, the control curves converge at a negative ordinant point 92 when the gap is open-circuited, whereat the drive motor 80 is driven at maximum speed in its reverse direction. It will, therefore, be evident from FIG. 7 that motor speed increases very rapidly in either direction with gap deviation from the preselected optimum or control gap width so that corrective measures of the positioning apparatus are quickly and effectively made. This results from the non-linear relationship between our control circuit output signal and gap spacing as described above in connection with FIGS. 1 and 5 of the drawings.

The control circuit positioning apparatus of the invention, therefore, provides a marked improvement over conventional positioning apparatus, the linear corrective action of which is illustrated graphically in FIG. 8 of the drawings, for purpose of comparison. In the latter figure, curve 94 represents the linear output or corrective action of conventional controlling systems as the discharge gap is varied in either direction from a preselected median gap width, i.e., one which is approximately midway between short and open-circuited gap conditions. Maximum and minimum ordinant points 96 and 98 respectively of the curve 94 show that maximum motor speed is available in either direction when the gap is short-circuited or open-circuited respectively. However, in those areas of the curve adjacent the control point 100 thereof, it will be apparent that the corrective action of conventional positioning apparatus is rather slow, and therefore, corrective actions taken by such apparatus to oppose deviations in width adjacent the control point are slow and thus inaccurate.

Moreover, when the balancing circuit of such conventional apparatus is adjusted to select a different optimum gap width, depending again upon machining conditions, the linear response becomes even less satisfactory as denoted by curves 102 and 104. Thus, when it is desired to control the gap width about an optimum spacing less than the median, which is frequently the case, particularly in fine or medium machining operations, it will be seen that much less than maximum motor speed is available for moving the electrode of the EDM apparatus in the event that the gap becomes short-circuited. This is illustrated by curve 102. On the other hand, for an optimum gap width greater than the median width 100, curve 104 shows a similar condition prevailing at the open-circuited condition of the gap. In the EDM process open-circuited gap conditions particularly occur when starting up the EDM apparatus.

In our control circuit and apparatus, however, a full or maximum response of the motor drive 80' (FIG. 5) in either direction is attained irrespective of the optimum gap width setting. This is shown by common points 90, 92 of the family of control curves 83, 84, 86, 88 of FIG. 7. Accordingly, a maximum corrective action is obtained for either open- or short-circuited gap conditions at any desired gap width control point therebetween.

Referring now to FIGS. 9 to 11 of the drawings, the advantages of the control signal as derived from the gap current duty cycle, in comparison with other control bases such as the gap current, gap voltage, and discharge rate or frequency are illustrated graphically. In FIG. 9 of the drawings curve 106 represents the gap current duty cycle, or the percentage or fraction of the time in which current flows at various gap widths. Curves 128 and 108 of FIG. 10 illustrate the variations in corresponding gap voltage and current respectively with changes in gap width. In FIG. 11 the corresponding frequency or rate of the gap discharges with similar variations in the gap width is shown by curve 110. In this example of the invention the optimum gap width is taken adjacent the peak 112 of the frequency curve 110 (FIG. 11) and is denoted in each of the FIGS. 9–11 by vertical dashed line 114. The dotted vertical line 116 of each of FIGS. 9–11 represents the minimum gap width at which the gap becomes effectively short circuited, as denoted by the flat portions 118 and 120 of the curves 106 and 108 respectively. Vertical lines 117 indicate that gap width at which the gap becomes effectively open-circuited.

In FIG. 9 of the drawings the knee 122 of the duty cycle curve 106 emphasizes the fact that the duty cycle curve 106 abruptly assumes a rather steep negative slope at the minimal gap width 116 at which the gap becomes short-circuited as denoted by the frequency curve 110 (FIG. 11). Ideally, this portion 124 of the duty cycle curve 106 is concave owing to the fact that the aforementioned voltage dropping means 24–26 is substantially constant. For the vast majority of EDM operations the gap width is controlled between the minimal spacing denoted by the vertical lines 116 and a maximum operable gap width denoted by vertical lines 126. Within this control area, then, it will be seen from FIG. 9 that the duty cycle curve 106, from which the control signal is derived in accordance with the invention, exhibits a pronounced slope having desirably a concave non-linearity. In contrast to the gap current curve 108 and the frequency curve 110, the concave non-linearity causes the duty cycle curve 106 to exhibit its steepest slope in the vicinity of the optimum gap width 114. On the other hand, the current curve 108 (FIG. 10), the voltage curve 128 (FIG. 10) and the frequency curve 110 (FIG. 11) show very little variation in the area immediately adjacent the optimum gap width 114 and therefore are unsuited for purposes of control signal derivation.

From the foregoing it will be apparent that novel and efficient forms of electrode control circuits and positioning apparatus for use particularly with electric discharge machining have been disclosed herein. It will be apparent, however, that the control circuit or positioning apparatus of the invention can be adapted to other applications wherein it is desired to control movements of the member in relation to pulse frequencies and the like. Therefore, while we have shown and described certain presently preferred embodiments of the invention and have illustrated preferred methods of practicing the same, it is to be distinctly understood that the invention is not limited thereto but may be otherwise variously embodied and practiced within the scope of the following claims.

We claim:

1. A control circuit for gap discharge apparatus and the like including a pair of relatively movable electrodes positioned normally to define a discharge gap therebetween and a discharge circuit coupled to said electrodes in gap bridging relationship and arranged to induce a series of electric discharges across said gap at a current duty cycle variable with the width of said gap, said control circuit comprising substantially constant voltage drop means connected directly to one of said electrodes in series with said discharge circuit and with said discharge gap, said constant voltage drop means having a voltage-current characteristic such that very little current flows therethrough until a predetermined voltage drop across said constant voltage drop means is attained, and circuit means coupled across said constant voltage drop means for sensing said voltage drop and for conducting signal voltages generated by said voltage drop means to external control mechanism for relatively moving said electrodes to adjust the width of said discharge gap.

2. The combination according to claim 1 wherein said constant voltage drop means includes a pair of relatively reversed parallel connected, unidirectional current limiting circuit components.

3. The combination according to claim 2 wherein peak voltage limiting resistance means are coupled in parallel to said constant voltage drop means.

4. The combination according to claim 1 wherein said control mechanism includes electric motor means, and said circuit means have an output coupled to said motor means include a source of standard potential connected in bucking relation to said output.

5. The combination according to claim 4 wherein said circuit means includes a balancing circuit and a voltage amplifier coupled to said circuit means output and having its output terminals coupled in series with said motor means and in series opposition with said standard potential source.

6. The combination according to claim 1 wherein said circuit means includes a series connected rectifier and parallel coupled capacitance and resistance means, said capacitance means being disposed for alternately charging through said rectifier and discharging through said resistance means to develop a signal across said resistance means proportional to the discharge current duty cycle of said discharge gap.

7. The combination according to claim 6 wherein said circuit means include a source of standard potential, said discharge resistance means are coupled to the input terminals of a DC voltage amplifier whose output terminals are coupled in series to electric motor means forming part of said control mechanism and in series opposition with said source.

8. The combination according to claim 6 wherein said resistance means are selectively variable for preselectively determining an optimum discharge gap width to which said control mechanism relatively moves said electrodes.

References Cited

UNITED STATES PATENTS 3,035,149  5/1962  Matulaitis.
3,340,478  9/1967  Poerschke.

JOSEPH V. TRUHE, Primary Examiner

R. F. STAUBLY, Assistant Examiner

U.S. Cl. X.R.

314—65

UNITED STATES PATENT OFFICE
CERTIFICATE OF CORRECTION

Patent No. 3,510,621                                                  May 5, 1970

Terry O. Hockenberry et al.

It is certified that error appears in the above identified patent and that said Letters Patent are hereby corrected as shown below:

Column 1, line 53, "kersene" should read -- kerosene --. Column 3, line 69, "area" should read -- are --. Column 4, line 37, "ararngement" should read -- arrangement --; same column 4, line 71 and column 5, line 21, "FIG.", each occurrence, should read -- FIGURE --; same column 5, line 68, "silcone" should read -- silicon --; line 72, "silicone" should read -- silicon --. Column 7, line 66, "potentiometer" should read -- rheostat --.

Signed and sealed this 5th day of January 1971.

(SEAL)
Attest:

Edward M. Fletcher, Jr.                         WILLIAM E. SCHUYLER, JR.
Attesting Officer                                          Commissioner of Patents